No. 679,537. Patented July 30, 1901.
M. H. NABER.
BICYCLE SADDLE SUPPORT.
(Application filed Dec. 19, 1898.)

(No Model.)

Witnesses.
A. J. Bell
Robert Ratcliffe

Inventor.
M. H. Naber
By Josiah McRoberts
his atty.

THE NORRIS PETERS CO., PHOTO-LITHO., WASHINGTON, D. C.

UNITED STATES PATENT OFFICE.

MOSES H. NABER, OF CHICAGO, ILLINOIS, ASSIGNOR, BY MESNE ASSIGNMENTS, TO EDWARD G. PAULING, OF SAME PLACE.

BICYCLE SADDLE-SUPPORT.

SPECIFICATION forming part of Letters Patent No. 679,537, dated July 30, 1901.

Application filed December 19, 1898. Serial No. 699,646. (No model.)

*To all whom it may concern:*

Be it known that I, MOSES H. NABER, a citizen of the United States, residing at Chicago, in the county of Cook and State of Illinois, have invented certain new and useful Improvements in Bicycle Saddle-Supports, of which the following is a specification.

My invention relates to improvements in bicycle saddle-supports in which the support yields to the motions of the rider and the jolts of the wheel; and the object of my improvement is to provide a support which shall accomplish these functions by a rocking or tilting action instead of by a springing action, as heretofore. I have attained this object by the device illustrated in the accompanying drawings, in which—

Figure 1:
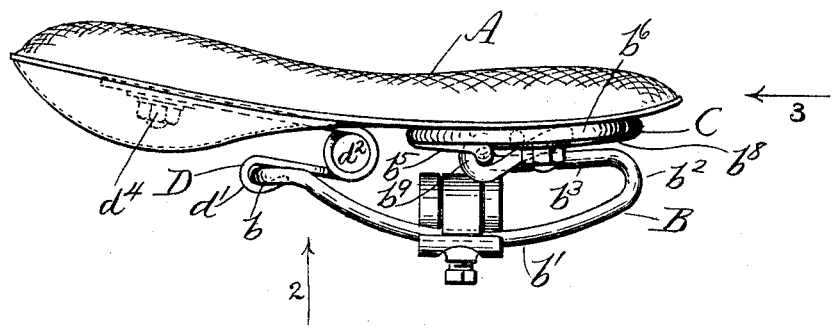
Figure 2:
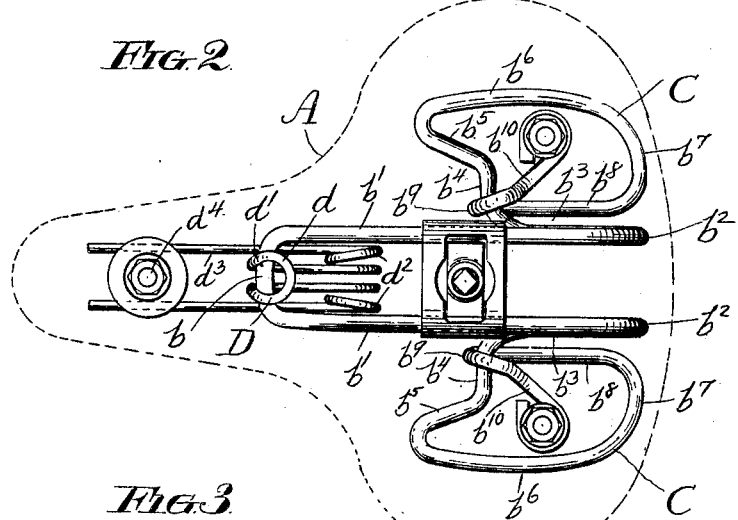
Figure 3:
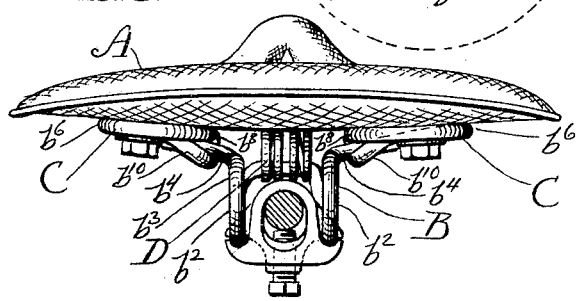
Figure 4:
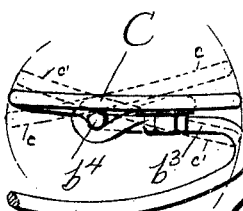

Figure 1 is a side view of the support, showing a saddle attached. Fig. 2 is a bottom plan view of the same. Fig. 3 is a rear view of the same. Fig. 4 is a detail showing the inclined positions of one of the wings under certain conditions of use.

In the drawings the reference-letter A indicates the saddle, which represents any of the standard forms, provided with a metallic shell or base.

The letter B represents the saddle-supporting frame, which is formed from a suitable piece of wire of appropriate weight and strength. The wire is cut the required length and is bent back upon itself to form a loop $b$, which is seated in a suitable spring D, as hereinafter more fully described. The base of the frame comprises the parallel legs $b'$ $b^3$. The legs $b'$ are adapted to receive the usual clamping device to attach the frame to the saddle-post and are bowed more or less in the manner common to devices of this form to allow the saddle to be adjusted to different angles. At the rear ends of the legs $b'$ the wire of the frame is again bent back upon itself, as at $b^2$, to form the forwardly-projecting legs $b^3$, which are in substantially the same vertical planes as the legs $b'$. At their inner ends the legs $b^3$ are bent outwardly at right angles to the frame to constitute the arms $b^4$, which form the immediate supports for the saddle-supporting wings C, which constitute the platform or seat, to which the saddle blank or plate is attached by suitable bolts. These wings, upon which the saddle-blank rests, are formed by projecting the wires of the supports $b^4$ forwardly and outwardly, as at $b^5$, and thence rearwardly to form the outer ribs $b^6$, at the rear ends of which the wires are curved inwardly at $b^7$ until they are just outside of the vertical planes of the legs $b^3$, as shown in Fig. 3, and are then carried forward to form the inner ribs $b^8$, which extend parallel with the legs $b^3$ and the ribs $b^6$ until they reach the arms $b^4$, over which they pass and about which they are bent at $b^9$ and from about the center of the wings, where they are formed into eyes or loops through which suitable bolts pass to attach the saddle. The arms $b^4$ and the forwardly-projecting portions $b^5$ are inclined upwardly above the horizontal plane of the legs $b^3$, as shown in Fig. 3, so that the wings C are in a horizontal plane slightly above the plane of the legs $b^3$, as clearly shown in this figure. The angular projections $b^{10}$ likewise extend upwardly to bring the eyes or loops into the plane of the platform. The ribs $b^6$ and $b^8$ are slightly concaved longitudinally in order to more snugly fit the saddle base or plate.

The auxiliary or supplemental spring D is formed of suitable wire, which is bent back upon itself to form the loop $d$ and thence is reversely curved to form the seat $d'$ for the loop of the spring B. The wires of the spring D are carried rearwardly a short distance and then preferably coiled or convoluted, as shown at $d^2$, and carried forwardly in two independent legs $d^3$, which pass between the saddle-base and a washer on the front nut $d^4$, by which they are clamped in place.

The wings C, which constitute the platform, are carried by the laterally-projecting arms $b^4$ and have a rocking or tilting motion about these arms as pivots or fulcrums against the torsional force of the material composing the arms. Thus when the rider inclines forwardly the wings assume a position similar to that shown at $c$ in Fig. 4 and when the rider inclines rearwardly similar to that shown at $c'$ in Fig. 4. When the strain from this unnatural position is removed, the tendency of the torsional force of the parts $b^4$ is to restore the saddle to its normal horizontal position. The rocking movement upon the pivots $b^4$ permits the saddle to automatically accommodate itself to the position of the rider's body. This capability of the platform to tilt or rock is of very great advantage when any shock or jar is caused by the rough roadway, as the saddle will give sufficiently to avoid all injury to the rider, but still will afford a sufficiently firm and rigid seat under all conditions. In the saddles as now constructed the jars incident to a rough road-bed are taken up by the yield or elasticity of springs, which act in an approximate up-and-down or vertical direction, something after the fashion of an ordinary spiral spring. In the supports constructed in accordance with my invention this up-and-down motion of the saddle is replaced by the rocking or tilting motion, as above described. The relative position of the legs $b^3$ and inner ribs $b^8$ allows the latter to move without contacting with the former upon the arms $b^4$ as pivots, and the concavity of the legs $b^6$ $b^8$ renders the wings susceptible to the slightest movement of the saddle. The wings are tightly held to the saddle by angular projections $b^{10}$, which pass around the arms $b^4$, as shown, and serve to clamp the wings firmly against the saddle, so that they act after the manner of a large washer. By this construction the strain which would otherwise be exerted on the bolts and would quickly cause them to work loose in the saddle-plate is taken from the bolts and distributed around the periphery of the wings after the fashion of a washer. When the saddle rocks or tilts on the arms $b^4$, the strain is thereby relieved from any point upon the saddle-plate and is distributed throughout to all the points of contact of the wings with the plate. This is also true when the saddle is depressed at one side by the action of the rider by pedaling. At such time as the leg completes its downward movement the saddle is depressed sidewise, and as the wings are tightly clamped to the base through their entire periphery after the manner of the washer, so that the two move together, the necessary yield occurs in the legs $b'$ $b^3$ between the points where the angular projections $b^{10}$ are twisted around the latter and where the former are clamped to the saddle-post. Under these strains the legs $b^3$ are bent slightly downward and out of the plane of the legs $b'$, as clearly shown at the right in Fig. 3, the principal part of the yield in such cases being in the legs $b^3$ themselves rather more than in the legs $b'$.

The supplemental spring D is not essential to make a complete and operative support; but the best results are obtained by using it in conjunction with the frame B, as it reinforces the base of the frame and prevents the saddle from tilting forward too easily. This auxiliary spring decreases the leverage on the legs $b'$ $b^3$, which is of advantage in maintaining the saddle horizontal, especially under heavy weight.

It has been found in practice that with a support made in accordance with my invention the saddle rocks upon the arms $b^4$ and that the greater part of its motion is about these arms as pivots, the up-and-down motion of the saddle not being present to any appreciable degree. The distance from the saddle and the pedal at any point in the revolution of the latter remains practically constant, as the former does not spring up and down after the manner of saddles now generally used, although it will at all times yield or rock forwardly or backwardly to take up the vibrations and shock of the wheel and will yield to the sidewise actions and movements of the rider.

While I have described my improvements in connection with saddles used on bicycles, I do not wish to be understood that their use is limited to such class of machines, as it is apparent that they may be employed with and are applicable to saddles and seats used on trackless machines of various kinds where the rider occupies a seat or saddle of the same general type—such, for example, as sulkies, horse-rakes, seeders, harvesters, binders, road-machines, and, in general, all classes of wheeled machinery.

Having thus described my invention, what I desire to claim and secure by Letters Patent is—

1. A support for bicycle-saddles, comprising a base having upper and lower legs, the latter being united in a loop, an integral torsional arm projecting laterally from each of said upper legs, wings formed of the continuation of said arms and having outer and inner ribs, the wire of the inner rib being bent around its associated arm and formed with a loop by which it is fastened to the saddle.

2. A saddle-supporting frame made from a single piece of wire and comprising a base, lateral arms, wings concave in longitudinal section, one on each of said arms, the inner rib of each wing being bent around its appropriate arm and terminating in an angular leg having a loop by which it is fastened to the saddle, substantially as and for the purposes described.

In testimony whereof I affix my signature in presence of two witnesses.

MOSES H. NABER.

Witnesses:
HARVEY YEAMAN,
J. McROBERTS.